United States Patent
Yajima

(10) Patent No.: US 6,344,933 B1
(45) Date of Patent: Feb. 5, 2002

(54) CAMERA LENS OPERATING UNIT

(75) Inventor: Shinya Yajima, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/281,940

(22) Filed: Mar. 31, 1999

(30) Foreign Application Priority Data

Mar. 31, 1998 (JP) .......................................... 10-086082

(51) Int. Cl.[7] .............................................. G02B 15/14
(52) U.S. Cl. ...................................................... 359/697
(58) Field of Search ................. 359/694, 697, 359/823, 698

(56) References Cited

U.S. PATENT DOCUMENTS

| | | | | |
|---|---|---|---|---|
| 5,134,525 A | * | 7/1992 | Kaneda ...................... | 359/697 |
| 5,227,814 A | * | 7/1993 | Yoshida et al. ............... | 396/60 |
| 5,434,621 A | * | 7/1995 | Yu ............................. | 348/347 |
| 5,438,190 A | * | 8/1995 | Kaneda et al. ........... | 250/201.3 |
| 5,448,413 A | * | 9/1995 | Kobayashi et al. ......... | 359/698 |
| 5,742,435 A | * | 4/1998 | Nagashima et al. ........ | 359/696 |

FOREIGN PATENT DOCUMENTS

JP        6-25007 1 A      9/1994

* cited by examiner

*Primary Examiner*—Ricky Mack

(57) ABSTRACT

When a focus setting part and a zoom setting part are operated, a control box, connected to a lens system, outputs a driving signal to the lens system and thereby moves a focus lens and a zoom lens to a position directed by the setting parts. At that time, if only the focus setting part is operated to move the focus lens, a zoom position where a view angle is maintained constant is obtained from correction data which is recorded in a lens view angle correction data part, and a driving signal for moving the zoom lens to the zoom position is output to the lens system.

11 Claims, 4 Drawing Sheets

F I G. 3
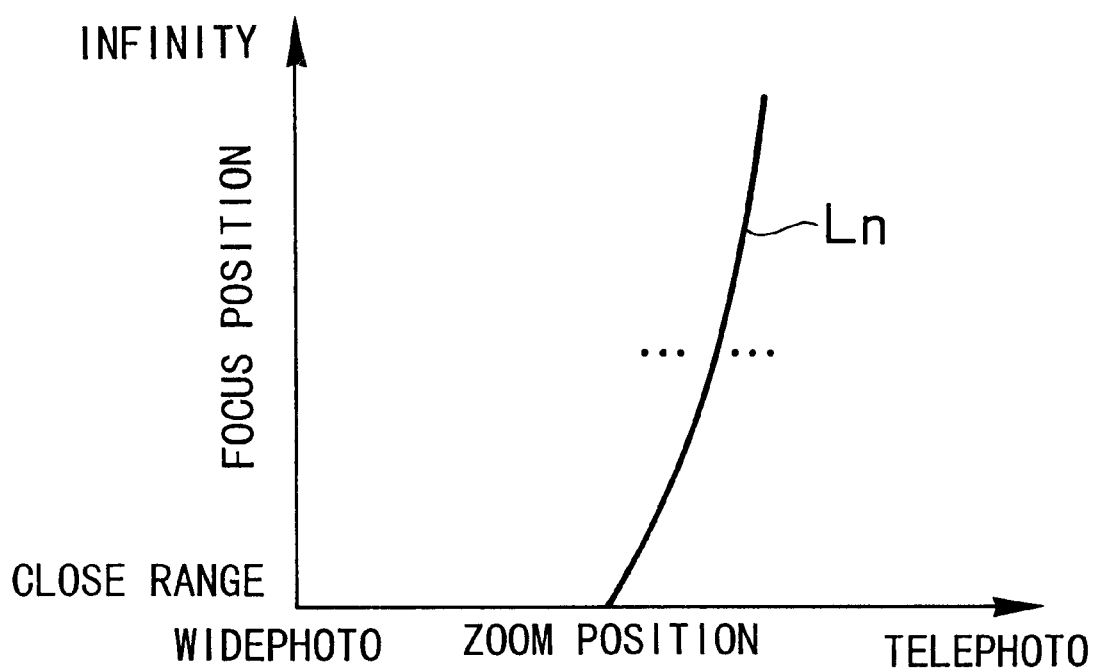

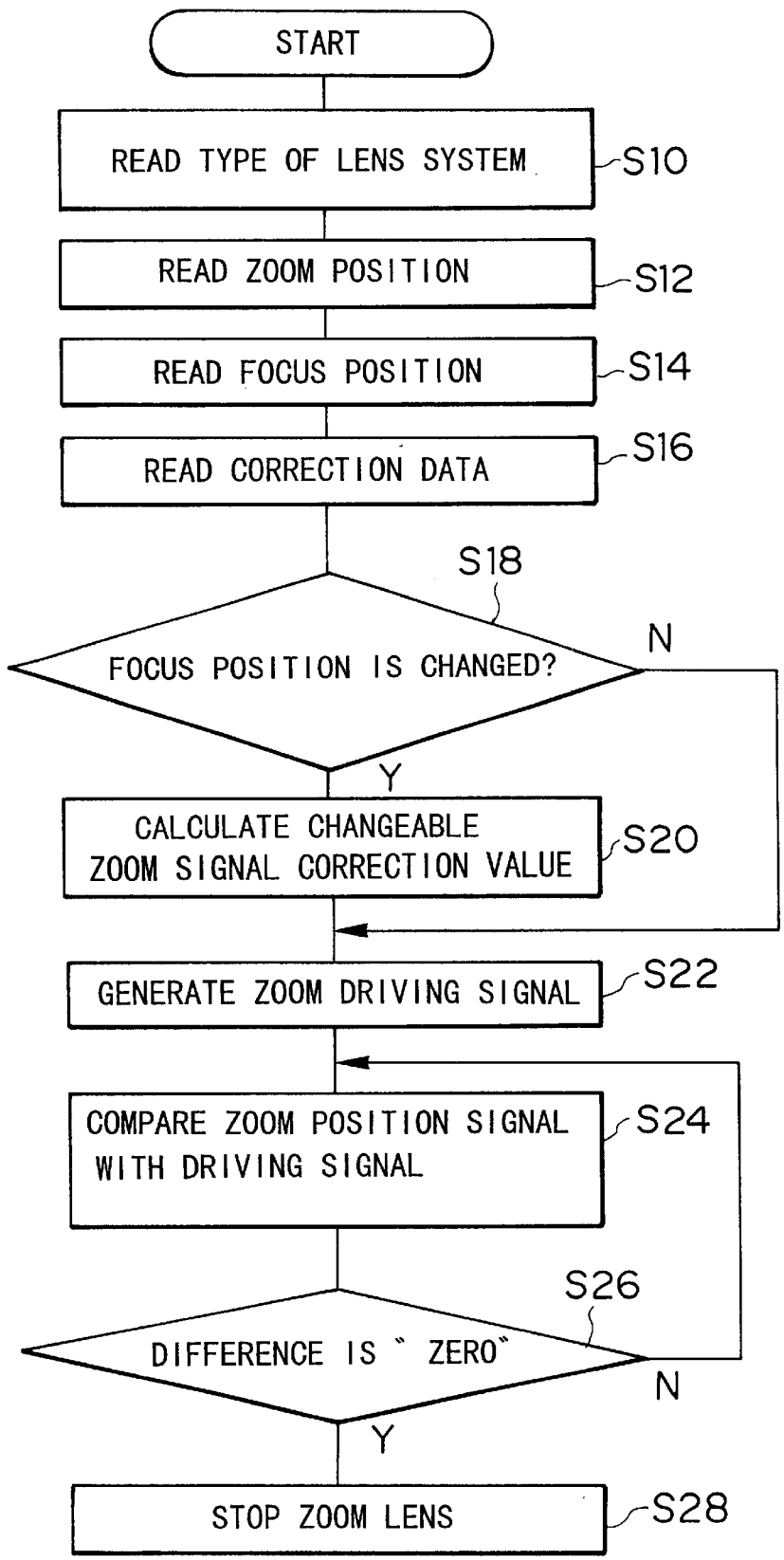

CAMERA LENS OPERATING UNIT

BACKGROUND OF THE INVENTION

1. Field of the Invention

The present invention relates to a camera lens operating unit, more particularly to a camera lens operating unit that corrects changes of a view angle caused by moving a focus lens of a TV camera.

2. Description of Related Art

In a conventional TV camera, a phenomenon has been observed: when a focussing is performed by moving a focus lens at a state where a zoom lens is set to a widephoto side, a view angle changes as if zooming was performed. This phenomenon is called a pumping phenomenon.

Japanese Patent Application Laid-open No. 6-250071 discloses a lens unit that corrects the pumping phenomenon by automatically adjusting the position of the zoom lens when a focus lens is moved. This lens unit, however, requires a change in process of a control part of the lens unit, so that there is a disadvantage in that this means cannot be applied to a lens unit already in use. In addition, in order to perform the pumping correction, contents of process of the lens unit must be complex; thus an amount of process of the lens unit was increased.

SUMMARY OF THE INVENTION

The present invention has been developed in view of the above-described circumstances, and has as its object the provision of a camera lens operating unit which can correct pumping without adding a change to the lens unit.

In order to achieve the above-described objects, the present invention is directed to a lens operating unit for transmitting a driving signal to a lens system having a focus lens, a zoom lens and a lens driver for moving the focus lens and the zoom lens in accordance with the driving signal, the lens operating unit comprising: a focus operating member; a zoom operating member; a lens position receiver for receiving a position signal representing positions of the focus lens and the zoom lens from the lens system; a storage device for storing data used to obtain a target position of the zoom lens with respect to a view angle of the lens system at each position of the focus lens and the zoom lens, the view angle being maintained constant when the focus lens moves to a position and the zoom lens moves to the target position; and a controlling device for obtaining, from the data stored in the storage device, the target position of the zoom lens when the focus lens moves based on an operation of the focus operating member, and controlling the lens driver to move the zoom lens to the obtained target position.

According to the present invention, pumping can be corrected by the lens operating unit without changing the control part of the lens unit, because a change of a view angle caused by moving the focus lens is automatically corrected by the instruction to move the zoom lens from the lens operating unit when moving the focus lens by the focus operating member of the lens operating unit.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a view for explaining a relationship between zoom positions (a horizontal axis) and focus positions (vertical axis) at which a view angle is constant; and FIG. 4 is a flow chart showing a processing sequence of pumping correction.

DETAILED DESCRIPTION OF THE PREFERRED EMBODIMENT

Hereunder a preferred embodiment of a camera lens operating unit of the present invention is described in detail according to the accompanying figures.

Figure 1:
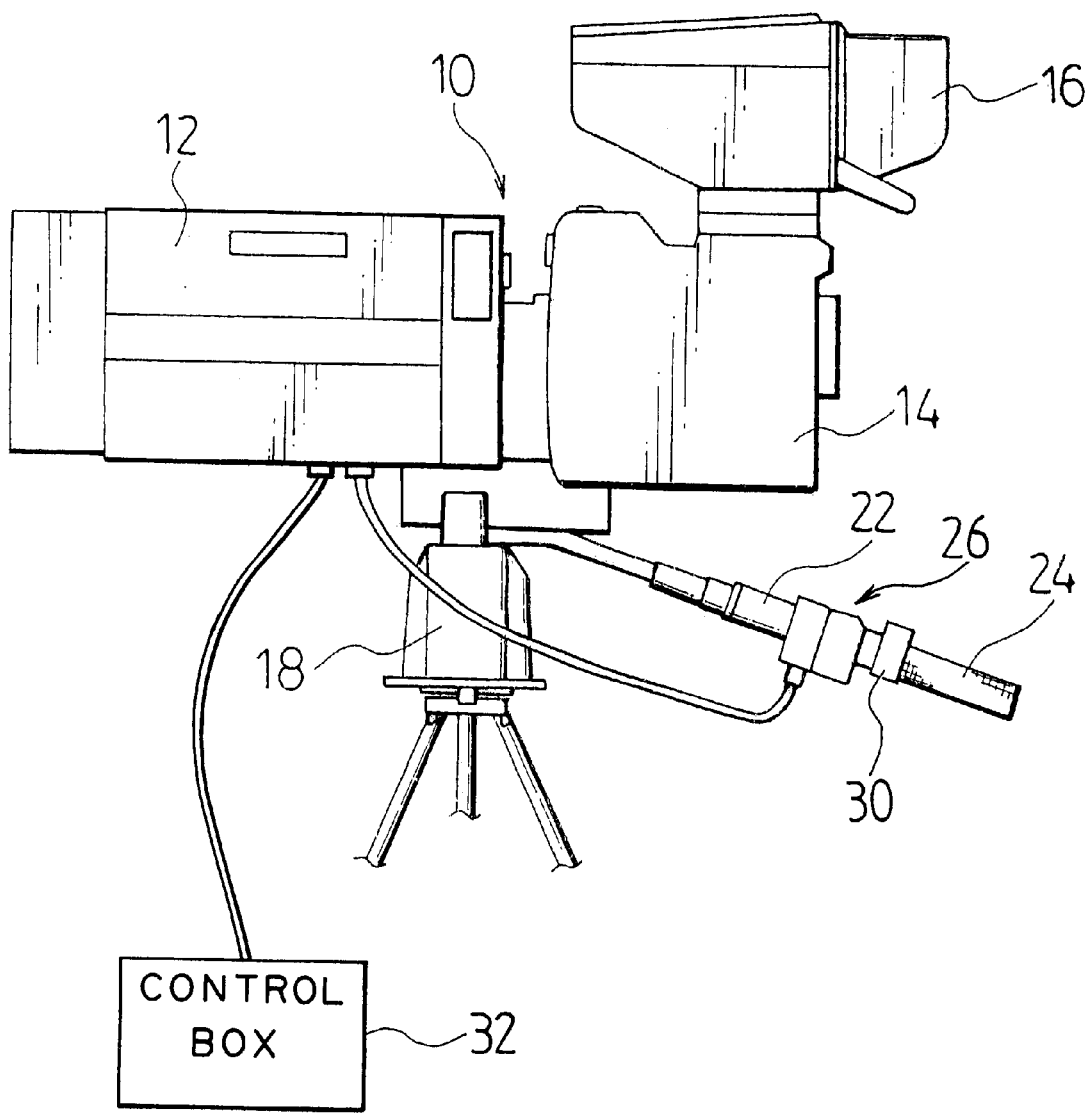
FIG. 1 is a view of the whole construction showing an embodiment of a TV camera system to which the present invention is applied.

FIG. 1 is a view of the whole construction showing an embodiment of a TV camera system to which the present invention is applied. A TV camera 10, fixed to a panhead 18, consists of a lens system 12 and a camera body 14. A pan/tilt rod 22 is extended to the panhead 18, and a grip portion 24 of the pan/tilt head 22 has a zoom demand 26 attached thereto. A focus demand is attached to the grip portion of the pan/tilt rod at the other side (not shown).

A cameraman adjusts zooming by manipulating a thumb ring 30 of the zoom demand 26 while viewing an object image on a finder 16 of the camera body 14; and at the same time the cameraman adjusts focussing by manipulating a focus ring of the focus demand.

Moreover, a control box 32 is connected to the lens system 12 via a cable.

The control box 32 is a lens operating unit for another person to operate. Operating the control box 32 enables another person to remote-control focus adjustment, zoom adjustment, and so on, of the lens system 12.

Figure 2:
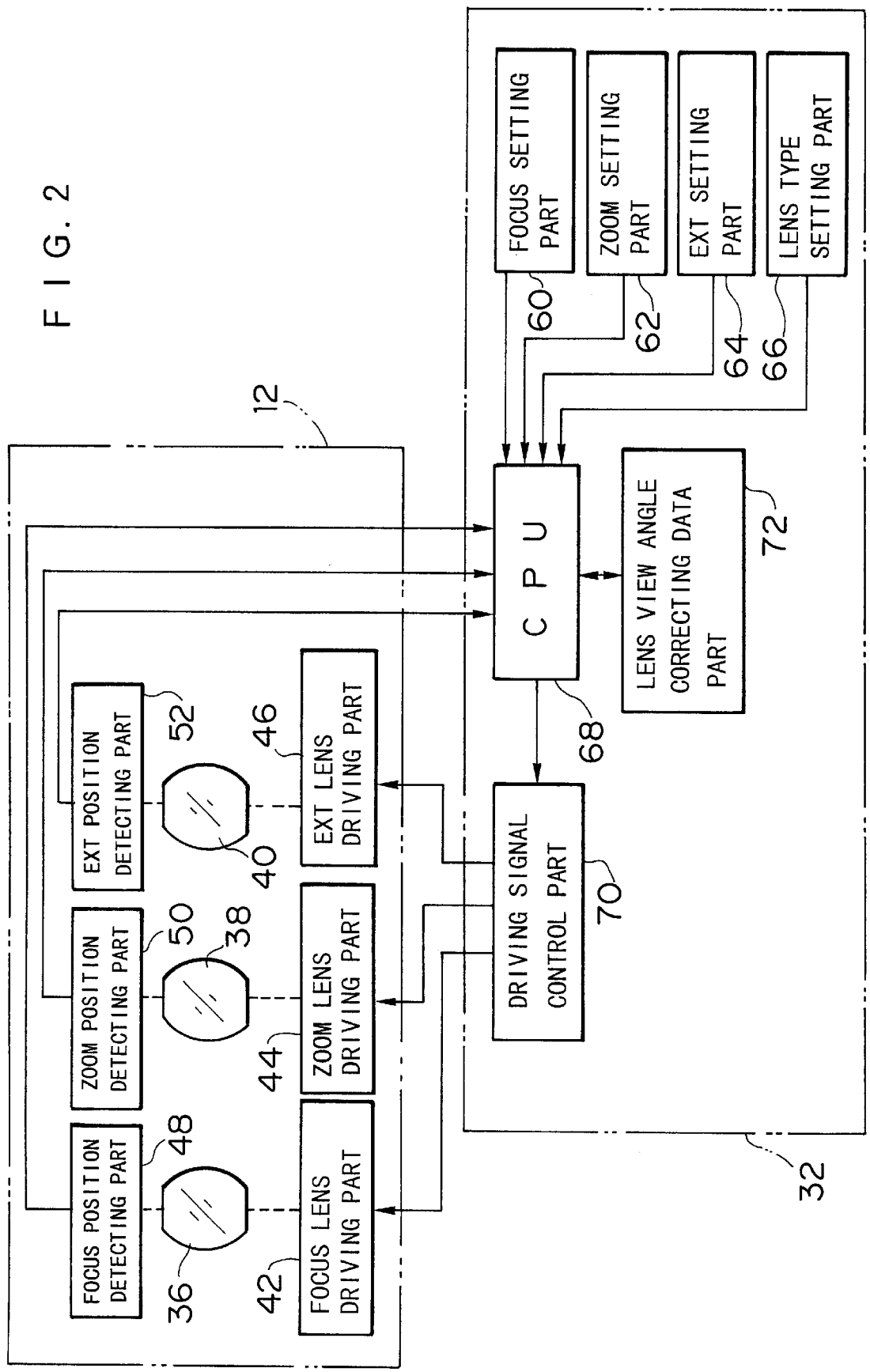
FIG. 2 is a view of the construction showing an embodiment of a control box and a lens unit to which the present invention is applied.

FIG. 2 is a view of a construction showing an embodiment of the control box 32 and the lens system 12 to which the present invention is applied. Directed to the lens system 12 at first, the lens system 12 is one which is used in common regardless of the present invention. As shown in FIG. 2, the lens system 12 has a focus lens 36, a zoom lens 38, and an extender lens (EXT lens) 40 arranged therein. Each of the lenses 36, 38, and 40 is driven by each of the driving motors of a focus lens driving part 42, a zoom lens driving part 44, and an EXT lens driving part 46, respectively.

The focus lens driving part 42, zoom lens driving part 44, and EXT lens driving part 46 are driven by a driving signal input from outside source; specifically as shown in FIG. 2, they are driven by driving signals input from the control box 32.

Moreover, a focus position detecting part 48, a zoom position detecting part 50, and an EXT position detecting part 52, each of which consists of a potentiometer, and so on, are provided to the lenses 36, 38, and 40, respectively. The position detecting part 48, 50, and 52 detect a position of respective lenses 36, 38, and 40, and transmit the detected position to the control box 32.

Next, directed to the construction of the control box 32 in FIG. 2, it consists of a focus setting part 60, a zoom setting part 62, an EXT setting part 64, a lens type setting part 66, a CPU 68, a driving signal control part 70, and a lens view angle correcting data part 72. The focus setting part 60 has a focus manipulating member (a knob for example), and when a user operates the focus manipulating member, the focus lens 36 can be set to a desired focus position. The focus setting part 60 detects an amount of manipulation of the focus manipulating member by a potentiometer, and inputs the detected value to the CPU 68. Similarly, the zoom setting part 62 has a zoom manipulating member, and when a user manipulates the zoom manipulating member, the zoom lens 38 can be set to a desired zoom position. The zoom setting part 62 detects an amount of manipulation of the zoom manipulating member by a potentiometer, and inputs the detected value to the CPU 68.

The EXT setting part 64 has a switch for switching a magnification of the extender lens 40 with times×1 and times×2 for instance, and inputs to the CPU which one of the magnifications of the extender lens is selected by the switch.

The lens type setting part 66 has a selecting switch to set a type of the lens system 12. A user can set the type of the lens system 12 with the selecting switch. For example, an identifier assigned to each type of the lens systems is selected by the selecting switch. The lens type setting part 66 inputs the type of the lens system 12 selected by the selecting switch to the CPU 68. Types of the lens system can be identified with the maximum magnification (times×20, times×30, times×70, and so on) of the lens system 12.

The CPU 68 obtains target positions where the focus lens 36 and the zoom lens 38 of the lens system 12 to be moved based on an amount of manipulation of the focus manipulating member and the zoom manipulating member which are input from the focus setting part 60 and the zoom setting part 62. Then the CPU 68 calculates differences between the target positions and controlled positions of the focus lens 36 and the zoom lens 38, which are input from the focus position detecting part 48 and the zoom position detecting part 50. After that, the CPU 68 instructs the driving signal control part 70 to output driving signals so that the differences are zero, that is, the target positions correspond to the controlled positions.

The driving signal control part 70 at receiving the instruction to drive the focus lens 36 or the zoom lens 38 from the CPU 68 outputs a focus driving signal or a zoom driving signal to the focus lens driving part 42 or the zoom lens driving part 44 of the lens system 12, respectively; thereby the focus lens 36 or the zoom lens 38 is moved.

The CPU 68 outputs the driving signal from the driving signal control part 70 and moves the focus lens 36 or the zoom lens 38. As a result, the CPU 68 stops the driving signal control part 70 to output the driving signal when the controlled position of the focus lens 36 or the zoom lens 38 which are input from the focus detecting part 48 or the zoom position detecting part 50 corresponds to the target position. Thus, the focus lens 36 and the zoom lens 38 are set at the positions which are instructed by the focus setting part 60 and the zoom setting part 62.

Moreover, the CPU 68 directs the driving signal control part 70 to output an EXT driving signal based on a signal input from the EXT setting part 64. Thus the EXT lens driving part 46 of the lens system 12 is driven and the extender lens 40 is switched to a magnification determined at the EXT setting part 64.

Further, if the CPU 68 moves the focus lens 36 to the focus position which is instructed by the focus setting part 60 as described above, the CPU 68 then performs the process to maintain the view angle by moving the zoom lens 38 automatically (pumping correction).

As shown in FIG. 3, positions where a view angle is equal are indicated with a curve Ln (n=1, 2, 3, . . . ) on the coordinate plane which illustrates the relationship between the zoom position (horizontal axis) and the focus position (vertical axis). According to the coordinate plane, when changing the focus position, a phenomenon (pumping phenomenon) occurs in which a view angle changes as if the zooming operation was performed in spite of that the zooming operation is not performed.

Considering the above-described reason, the CPU 68 prevents the pumping phenomenon from occurring by automatically changing the zoom position on the above-mentioned curve Ln where the view angle is maintained constant with referring to correction data which is stored in the lens view angle correction data part 72. A position of the zoom lens 38, where the view angle is maintained constant with respect to a view angle at each position of the focus lens 36 and the zoom lens 38, is recorded as correction data in the lens view angle correcting data part 72. The correction data may be a data indicating the formula of the curve Ln illustrated in FIG. 3 for example. The correction data may also be a value data in which, the relationship between the position of the focus lens 36 after moving and the position of the zoom lens 38 where the view angle is maintained constant after moving the focus lens 36, is shown with respect to each position of the focus lens 36 and the zoom lens 38 with a form of table. The CPU 68 refers to the correction data for obtaining the position of the zoom lens 38 where the view angle is maintained constant.

The lens view angle correction data part 72 has the correction data of a few types of the lens system 12 recorded thereof. The CPU 68 reads the correction data for types of the lens system 12 which is set by the lens type setting part 66.

FIG. 4 is a flow chart showing the sequential process (the sequential process regarding the control of the zoom lens 38) of pumping correction of the CPU 68. At first, the CPU 68 inputs a type of the lens system 12 from the lens type setting part 66 at initial setting. For example, in a case a type of lens system 12 can be identified by the maximum magnification of the lens system 12, the magnification is input from the lens type setting part 66 (Step S10).

When the initial setting is finished, the CPU 68 repeatedly executes the process hereafter described. First, the CPU 68 inputs the positions of the zoom lens 38 and the focus lens 36 from the zoom position detecting part 50 and the focus position detecting part 48 of the lens system 12 (Steps S12 and S14). Then the correction data, corresponding to the positions of the zoom lens 38 and the focus lens 36, is read from the lens view angle correction data part 72 (Step S16). The correction data for the types of the lens system 12 which is input at the initial setting is read.

Next, the CPU 68 determines whether the position of the focus lens 36 is changed (Step S18); that is, the CPU 68 determines whether the setting for the focus position directed by the focus setting part 60 is changed. If the answer is YES, the CPU 68 calculates, based on the correction data, the position of the zoom lens 38 where the view angle is maintained constant (Step S20). Then, the CPU 68 instructs the driving signal control part 70 to generate a zoom driving signal, for moving the zoom lens 38 to the calculated position (Step S22).

On the other hand, if the position of the focus lens 36 is unchanged at the Step S18, the CPU 68 instructs the driving signal control part 70 to generate zoom driving signal for moving the zoom lens 38 to the zoom position directed by the zoom setting part 62 (Step S22).

After that, when the zoom driving signal is generated from the driving signal control part 70 to move the zoom lens 38 at Step S22, the CPU 68 inputs the position of the zoom lens 38 from the zoom position detecting part 50, obtains the difference between the input zoom position and the target zoom position (Step S24), and determines whether the difference is zero (Step S26). If the difference is zero, the CPU 68 stops the zoom driving signal so as to stop the zoom lens 38 (Step S28).

By the above-described process, when the focus lens 36 is moved, the zoom lens 38 is automatically driven by the CPU 68 of the control box 32; thus the view angle is prevented from changing.

In the above-described embodiment, the correction data for a few types of the lens system 12 is stored in the lens view angle correction data part 72; but the present invention is not restricted to that. A user may exchange the correction data of the lens view angle correction data part 72 in accordance with a type of the lens system 12. For instance, a floppy disk in which the correction data for a type of the lens system 12 is recorded, is used by inserting it into the control box 32. In that case, the lens type setting part 66 is unnecessary because the type of the lens system does not have to be identified.

Moreover, in the above-described embodiment, a case in which the present invention is applied to the control box 32 which remotely operates the lens system 12 is described. But the present invention is not restricted to that. The present invention can be applied to other lens operating units such as the zoom demand 26 and the focus demand shown on FIG. 1.

As described above, according to the camera lens operating unit related to the present invention, when the focus lens is moved by the focus operating member of the lens operating unit, a change in the view angle caused by moving the focus lens is automatically corrected by the instruction from the lens operating unit for moving the zoom lens. Therefore, the lens operating unit can perform pumping correction in automatic manner without changing the control part of the lens system.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens operating unit for transmitting a driving signal to a remote lens system having a focus lens, a zoom lens and a lens driver for moving the focus lens and the zoom lens in accordance with the driving signal, the lens operating unit comprising:

a focus operating member;

a zoom operating member;

a lens position receiver for receiving a position signal representing positions of the focus lens and the zoom lens from the lens system;

a storage device for storing data used to obtain a target position of the zoom lens with respect to a view angle of the lens system at each position of the focus lens and the zoom lens, the view angle being maintained constant when the focus lens moves to a position and the zoom lens moves to the target position; and a controlling device for obtaining, from the data stored in the storage device, the target position of the zoom lens when the focus lens moves based on an operation of the focus operating member, and automatically and remotely controlling the lens driver to move the zoom lens to the obtained target position.

2. The lens operating unit as set forth in claim 1, wherein the data stored in the storage device is changed in accordance with a type of the lens system.

3. The lens operating unit as set forth in claim 1, wherein:

the data stored in the storage device includes data for a plurality of types of lens systems; and the controlling device obtains data in accordance with a type of the lens system.

4. The lens operating unit as set forth in claim 1, wherein the focus operating member and the zoom operating member are arranged integrally in a control box.

5. The lens operating unit as set forth in claim 1, wherein the focus operating member and the zoom operating member are arranged separately as a focus demand and a zoom demand, respectively.

6. A camera lens operating unit comprising:

a lens system including at least one focus lens and at least one zoom lens; and control means for remotely controlling the at least one zoom lens to be automatically moved in response to movement of the at least one focus lens to maintain a view angle of the lens system substantially constant.

7. The camera lens operating unit of claim 6, wherein the movement of the at least one zoom lens by said control means substantially negates a pumping phenomenon.

8. A camera lens operating unit for adjusting a separate and remote lens system, the lens system including at least one focus lens and at least one zoom lens, said camera lens operating unit comprising:

a driving signal control part for remotely controlling the at least one zoom lens to be automatically moved in response to movement of the at least one focus lens using view angle correcting data to maintain a view angle of the lens system substantially constant.

9. The camera lens operating unit of claim 8, wherein the movement of the at least one zoom lens by said driving signal control part substantially negates a pumping phenomenon.

10. The camera lens operating unit of claim 8, wherein the movement of the at least one zoom lens by said control box substantially negates a pumping phenomenon.

11. A camera lens operating unit for adjusting a separate and remote lens system, the lens system including at least one focus lens and at least one zoom lens, said camera lens operating unit comprising:

a control box for remotely controlling the at least one zoom lens to be automatically moved in response to movement of the at least one focus lens using view angle correcting data to maintain a view angle of the lens system substantially constant.

* * * * *